(12) United States Patent
Moore (10) Patent No.: US 8,888,066 B2
(45) Date of Patent: Nov. 18, 2014

(54) ADJUSTABLE HOLDER OF A HYDRAULIC BRAKE DEVICE FOR A BICYCLE

(71) Applicant: Wayne-Ian Moore, Changhua County (TW)

(72) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 225 days.

(21) Appl. No.: 13/719,191

(22) Filed: Dec. 18, 2012

(65) Prior Publication Data

US 2014/0166847 A1  Jun. 19, 2014

(51) Int. Cl.
*F16M 11/00* (2006.01)
*B62L 3/02* (2006.01)

(52) U.S. Cl.
CPC ..................................... *B62L 3/023* (2013.01)
USPC ........... 248/674; 248/675; 248/200; 248/694; 188/344

(58) Field of Classification Search
USPC ........ 248/674, 694, 675, 90, 200, 201, 205.1, 248/220.21, 220.22, 251, 682, 640, 671; 188/344, 24.22, 2 D, 151 R, 196 A, 352, 188/353, 357, 358, 359, 360; 60/584, 585, 60/592; 74/501.5 H, 551.8
See application file for complete search history.

(56) References Cited

U.S. PATENT DOCUMENTS

| | | | | |
|---|---|---|---|---|
| 4,602,781 | A * | 7/1986 | La Marsh et al. ............... | 482/58 |
| 5,078,391 | A * | 1/1992 | Moore, Sr. ...................... | 482/59 |
| 5,775,466 | A * | 7/1998 | Banyas et al. ............. | 188/24.21 |
| 6,804,961 | B2 * | 10/2004 | Lumpkin ........................ | 60/588 |
| 7,757,821 | B2 * | 7/2010 | Tetsuka et al. .................. | 188/26 |
| 7,815,156 | B2 * | 10/2010 | Yang .......................... | 248/218.4 |
| 7,857,112 | B1 * | 12/2010 | Tsai et al. ..................... | 188/344 |
| 8,074,774 | B2 * | 12/2011 | Lumpkin .................. | 188/24.22 |
| 8,342,305 | B2 * | 1/2013 | Moore ......................... | 188/344 |
| 8,783,429 | B2 * | 7/2014 | Moore ......................... | 188/344 |
| 2006/0185360 | A1* | 8/2006 | Takizawa et al. ............ | 60/547.1 |
| 2012/0048660 | A1* | 3/2012 | Moore ...................... | 188/151 R |
| 2013/0192941 | A1* | 8/2013 | Lin ............................. | 188/344 |
| 2013/0240313 | A1* | 9/2013 | Moore .......................... | 188/344 |

* cited by examiner

*Primary Examiner* — Terrell McKinnon
*Assistant Examiner* — Monica Millner (57) ABSTRACT

An adjustable holder of a hydraulic brake device for a bicycle which is assembled on a steering tube and is located between a stem and a head part includes a holder, a first adjusting member and a second adjusting member. The holder has a fixing portion and a fastening portion defined at two ends thereof respectively. A hydraulic brake device is assembled to a bottom of the holder. The fastening portion has a fastening hole opened therethrough. The fastening hole sleeves onto the steering tube. One end of the first adjusting member and one end the second adjusting member are abutted against two ends of the fastening hole respectively. Therefore, an angle between the holder and the steering tube is adjustable, which corresponds to an elevation angle of the stein.

6 Claims, 7 Drawing Sheets

ADJUSTABLE HOLDER OF A HYDRAULIC BRAKE DEVICE FOR A BICYCLE

BACKGROUND OF THE INVENTION

1. Field of the Invention

The present invention relates to a hydraulic brake device for a bicycle and more particularly to an adjustable holder of a hydraulic brake device for a bicycle.

2. Description of Related Art

A conventional hydraulic brake device for a bicycle comprises a controlling unit, a hydraulic unit and a brake unit. The controlling unit comprises at least one brake cable and at least one connecting rod. Two ends of each brake cable are connected to a brake lever and one end of each corresponding connecting rod respectively. The hydraulic unit comprises an oil tank, at least one pusher, at least one piston, at least one elastic member and at least one oil pipe. Each connecting rod is pivotally assembled to the oil tank. When a rider presses the brake lever so as to pull one brake cable and drive one connecting rod moving toward one brake cable, one pusher is moved to push one piston and compress one elastic member; thereby, a volume of oil in the oil tank flows into two main piston of the brake unit via one oil pipe and the two main pistons are moved toward the brake disc, so that two brake pads are moved toward a brake disc and brake a bicycle. Wherein, the hydraulic unit of the conventional hydraulic brake device is defined in a bicycle stern or a single device which is mounted on the bicycle.

However, the conventional hydraulic brake device for a bicycle has two disadvantages as following.

Firstly, the hydraulic unit of the conventional hydraulic brake device is defined in a bicycle stern, so that the manufacturing process of the bicycle stem with the hydraulic unit is more difficult and inconvenient to assemble the relative elements.

Secondly, although the hydraulic unit of the conventional hydraulic brake device could define in the single device which is mounted on one portion of the bicycle by a quick release element, the conventional hydraulic brake device cannot be adapted to variable inclination angles of bicycle elements, so that the conventional hydraulic brake device is inconvenient to be assembled on the bicycle.

The present invention has arisen to mitigate and/or obviate the disadvantages of the conventional hydraulic brake device.

SUMMARY OF THE INVENTION

The main objective of the present invention is to provide an improved hydraulic device for a bicycle.

To achieve the objective, an adjustable holder of a hydraulic brake device for a bicycle which is assembled on a steering tube and is located between a stem and a head part comprises a holder, a first adjusting member and a second adjusting member, the holder having a fixing portion and a fastening portion defined at two ends thereof respectively, a hydraulic brake device assembled to a bottom of the fixing portion of the holder, the fastening portion having a fastening hole opened therethrough, the fastening hole sleeving onto the steering tube, the first adjusting member and the second adjusting member sleeving onto the steering tube, one end of the first adjusting member and one end the second adjusting member abutted against two ends of the fastening hole respectively, another end of the first adjusting member abutted against one end of the stem, another end of the second adjusting member abutted against one end of the head part. Wherein the fastening hole of the holder has a first conical plane defined at one end thereof and a second conical plane defined at another end thereof; the first conical plane and the second conical plane are inclined toward a center of the fastening hole; the first adjusting member has a first abutting conical plane defined at one end thereof; the first abutting conical plane is abutted against the first conical plane; the second adjusting member has a second abutting conical plane defined at one end thereof; the second abutting conical plane is abutted against the second conical plane; the first conical plane further has two first limiting surfaces which are opposite to each other; the second conical plane further has two second limiting surfaces which are opposite to each other; the first adjusting member has two first vertical edges; each first vertical edge is abutted against each corresponding first limiting surface; the second adjusting member has two second vertical edges;

each second vertical edge is abutted against each corresponding second limiting surface; therefore, each first limiting surface and each second limiting surface are abutted against each corresponding first vertical edge and each corresponding second vertical edge respectively so as to prevent the holder from being deflected relative to the steering tube and to restrict the holder to be rotated relative to the stem; the holder has two connecting ribs which connect the fixing portion and the fastening portion; a distance is defined between the two connecting ribs; the holder has a plurality of through holes opened therethrough and a distance is defined between every two adjacent through holes; a plurality of screws pass through the corresponding through holes and screw into the hydraulic brake device so as to fasten the hydraulic brake device on the holder; the holder has a plurality of via holes defined at an outer periphery of the fastening portion; a plurality of fastening screws pass through the corresponding via holes; a terminal end of each fastening screw is abutted against an outer periphery of the steering tube.

Under this arrangement, an angle between the holder and the steering tube is adjustable because of the first adjusting member and the second adjusting member which are abutted against the two ends of the fastening hole respectively, so that the angle of the holder relative to the steering tube is adjusted and corresponds to an elevation angle of the stem.

Further benefits and advantages of the present invention will become apparent after a careful reading of the detailed description with appropriate reference to the accompanying drawings.

DETAILED DESCRIPTION OF THE INVENTION

Referring to FIGS. 1-4, an adjustable holder of a hydraulic brake device for a bicycle in accordance with the present invention which is assembled on a steering tube 11 and is located between a stem 12 and a head part 13 comprises a holder 2, a first adjusting member 4 and a second adjusting member 5.

The holder 2 has a fixing portion 21 and a fastening portion 22 defiled at two ends thereof respectively. A hydraulic brake device 3 is assembled to a bottom of the fixing portion 21 of the holder 2. Wherein the hydraulic brake device 3 has at least one piston (not shown) assembled therein and connected to at least one brake lever 14 via at least one brake cable 31; when a rider presses a brake lever 14 to pull one brake cable 31, one brake cable 31 drives one piston so that the oil flows into a oil pipe 32 and drives a brake of a bicycle (The structure and the actuating mechanism of the hydraulic brake device 3 are not limited in the present invention.).

The fastening portion 22 has a fastening hole 221 opened therethrough. The fastening hole 221 sleeves onto the steering tube 11.

The first adjusting member 4 and the second adjusting member 5 sleeve onto the steering tube 11. One end of the first adjusting member 4 and one end the second adjusting member 5 are abutted against two ends of the fastening hole 221 respectively. Another end of the first adjusting member 4 is abutted against one end of the stem 12. Another end of the second adjusting member 5 is abutted against one end of the head part 13.

Under this arrangement, the first adjusting member 4 and the second adjusting member 5 are abutted against the two ends of the fastening hole 221 respectively, so that an angle of the holder 2 relative to the steering tube 11 is adjustable, which corresponds to an elevation angle of the stem 12.

Referring to FIG. 2 and FIGS. 5-7, the detail descriptions are described as following.

The fastening hole 221 of the holder 2 has a first conical plane 222 defined at one end thereof and a second conical plane 223 defined at another end thereof. The first conical plane 222 and the second conical plane 223 are inclined toward a center of the fastening hole 221. The first adjusting member 4 has a first abutting conical plane 41 defined at one end thereof. The first abutting conical plane 41 is abutted against the first conical plane 222. The second adjusting member 5 has a second abutting conical plane 51 defined at one end thereof. The second abutting conical plane 51 is abutted against the second conical plane 223. Therefore, the first adjusting member 4, the second adjusting member 5 and the holder 2 are movable because of the first abutting conical plane 41 and the second abutting conical plane 51 which correspond to the first conical plane 222 and the second conical plane 223, so that the holder 2 is adjustable relative to the first adjusting member 4 and the second adjusting member 5. Furthermore, the stem 12 and the head part 13 are abutted against the first adjusting member 4 and the second adjusting member 5 respectively, so that the angle of the holder 2 relative to the steering tube 11 are adjustable and corresponds to the elevation angle of the stem 12, wherein the holder 2 is mounted under the stem 12 so that the brake cable 31 and the oil pipe are arranged on the bicycle conveniently.

Figure 1:
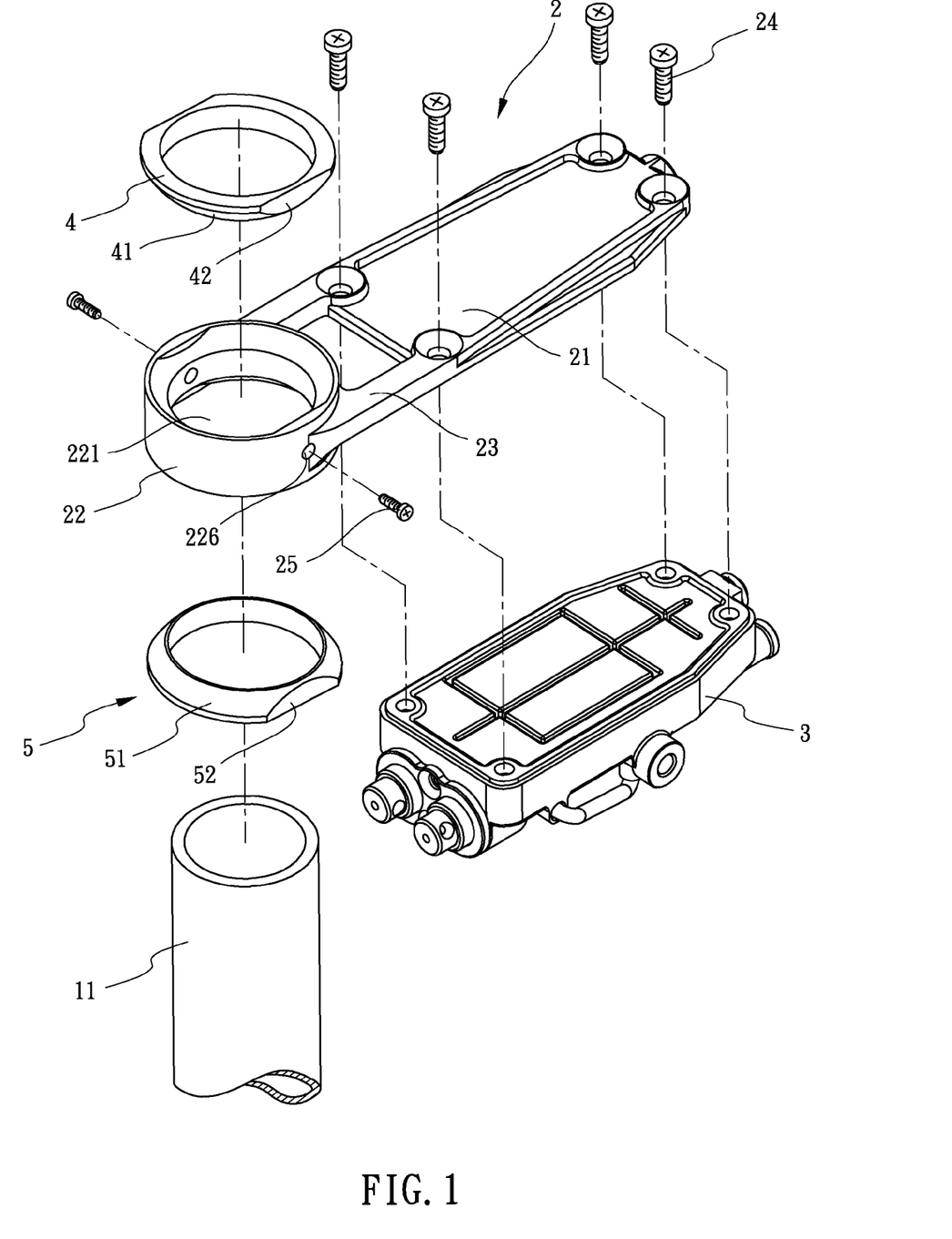
FIG. 1 is an exploded view of an adjustable holder of a hydraulic brake device for a bicycle of the present invention.
Figure 2:
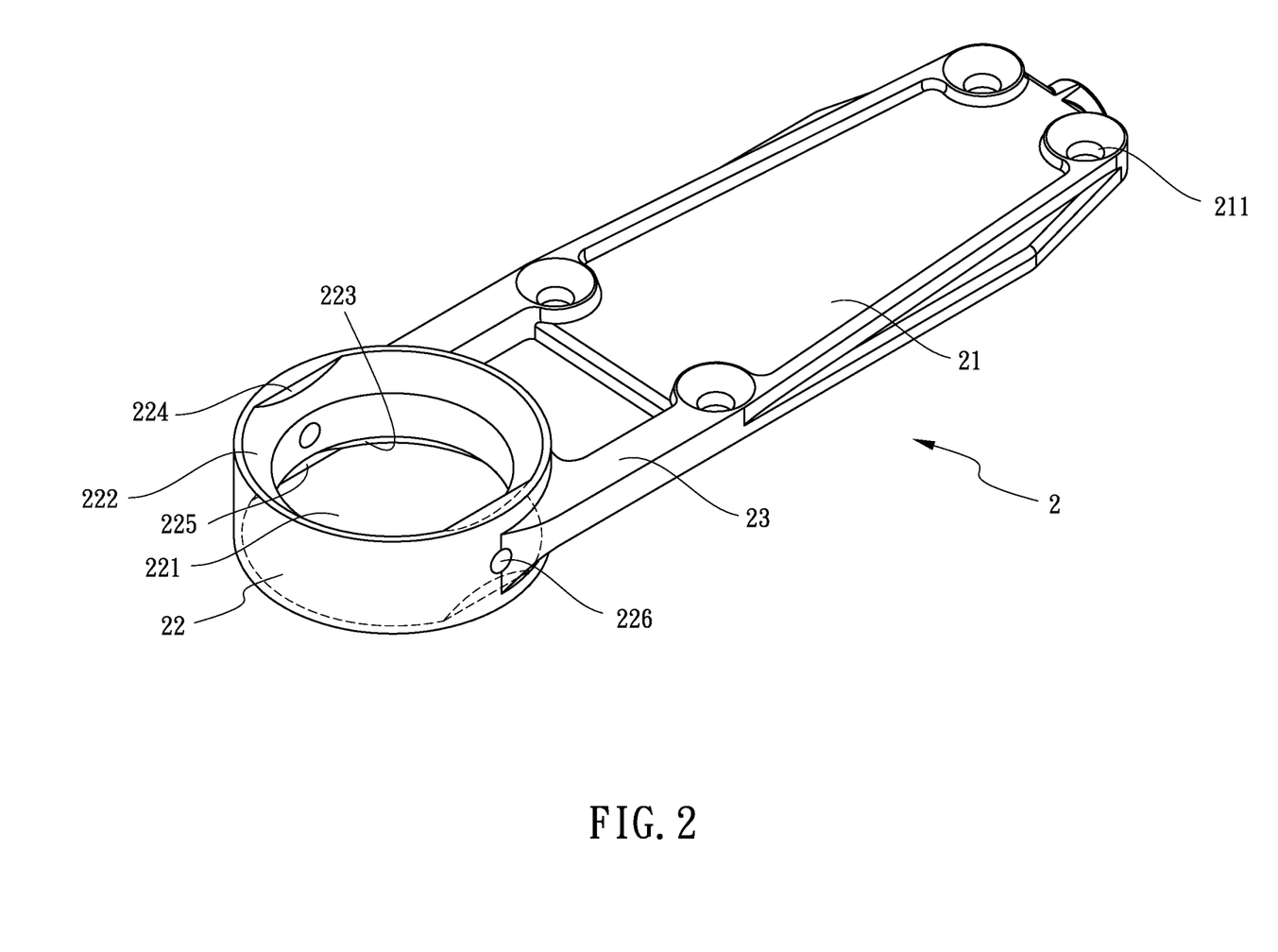
FIG. 2 is a perspective view of an adjustable holder of the present invention.
Figure 3:
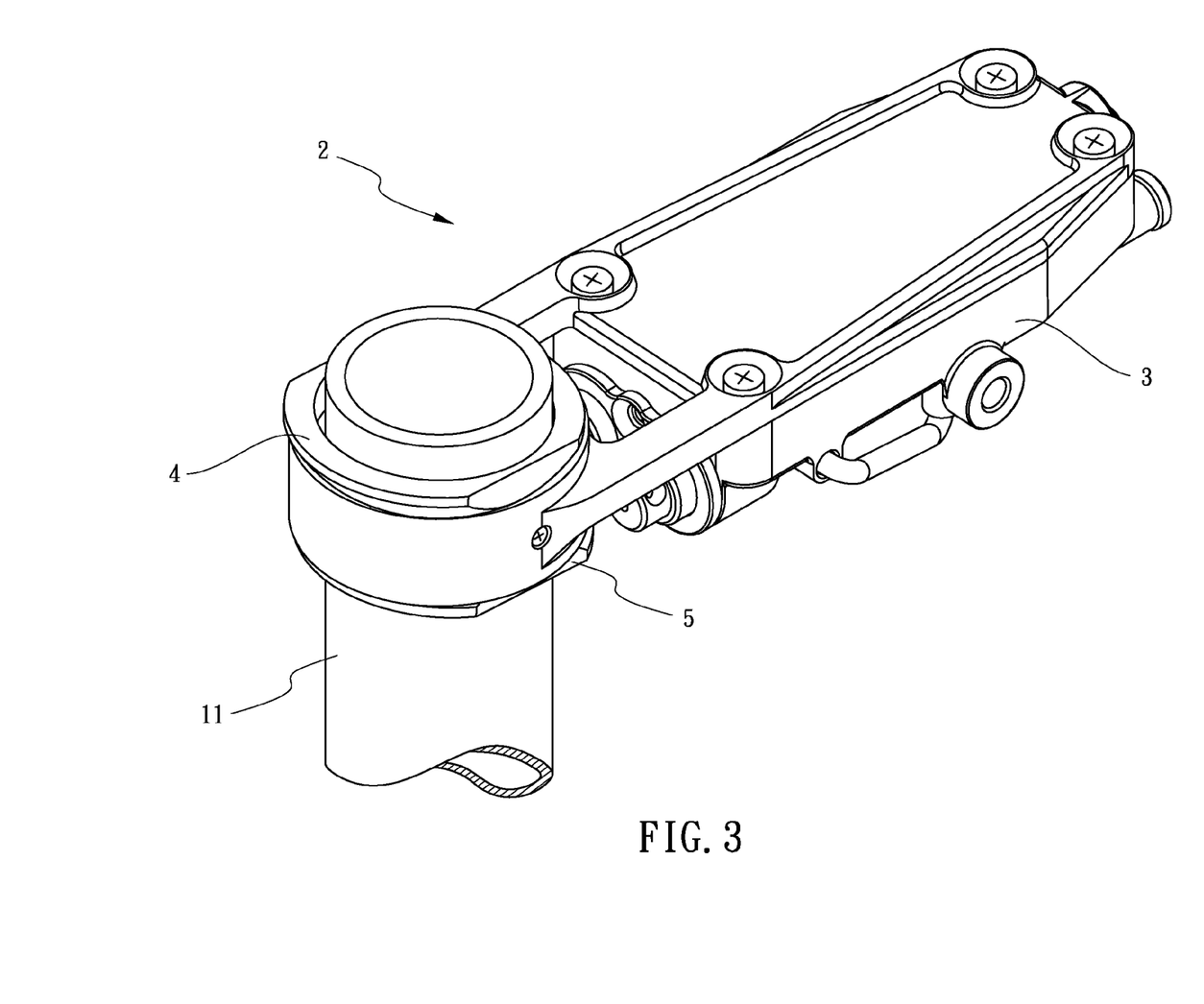
FIG. 3 is a schematic view for showing the present invention is assembled to a steering tube of a bicycle.
Figure 4:
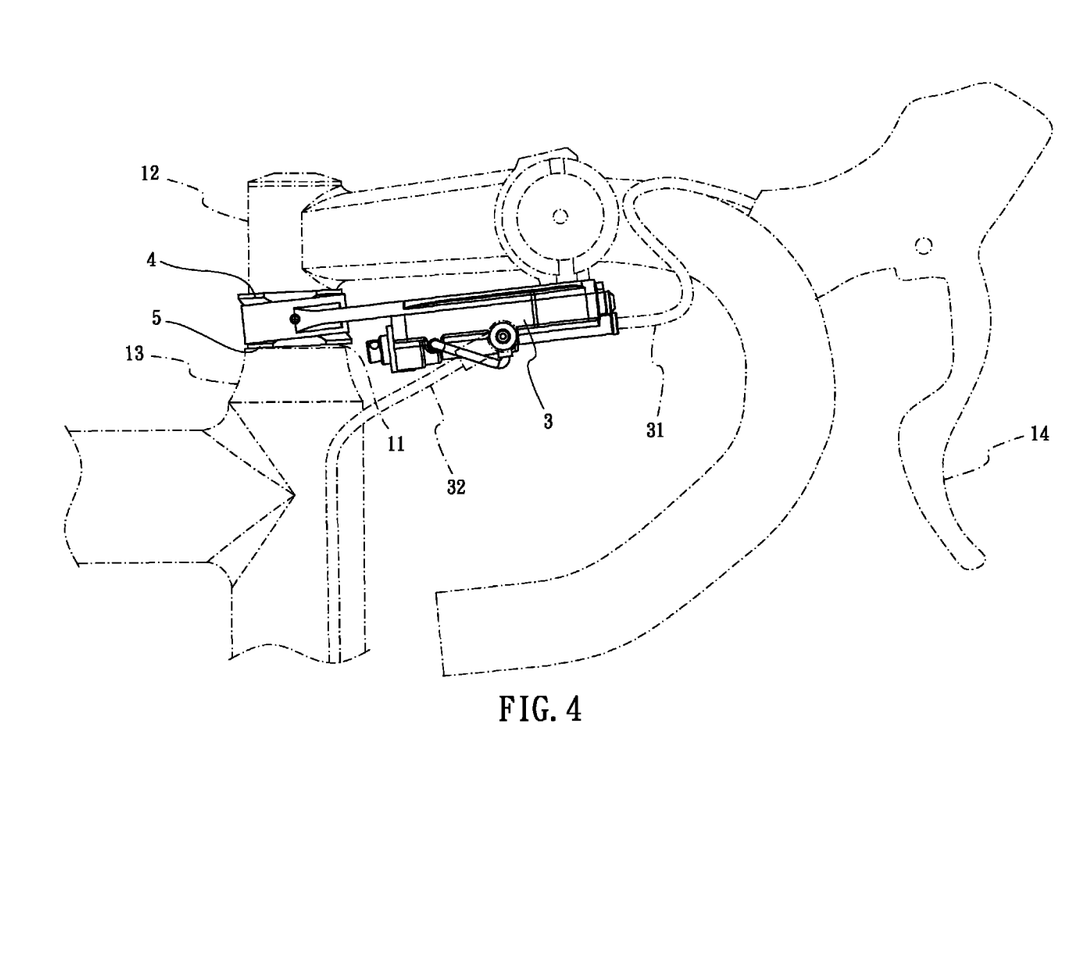
FIG. 4 is a side view for showing the present invention is assembled to the bicycle.
Figure 5:
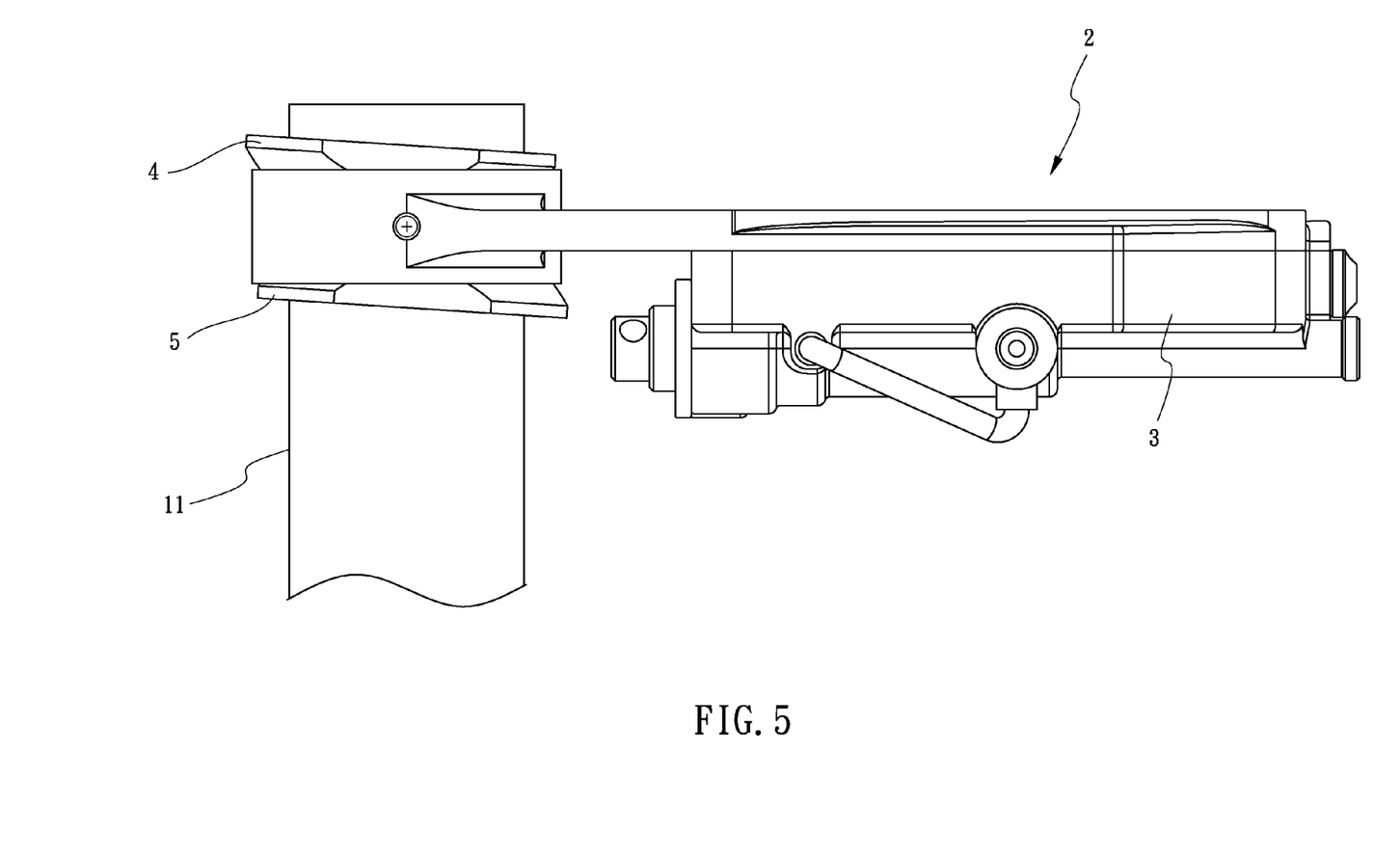
FIG. 5 is a side view for showing the present invention is under a horizontal state relative to the steering tube of the bicycle.
Figure 6:
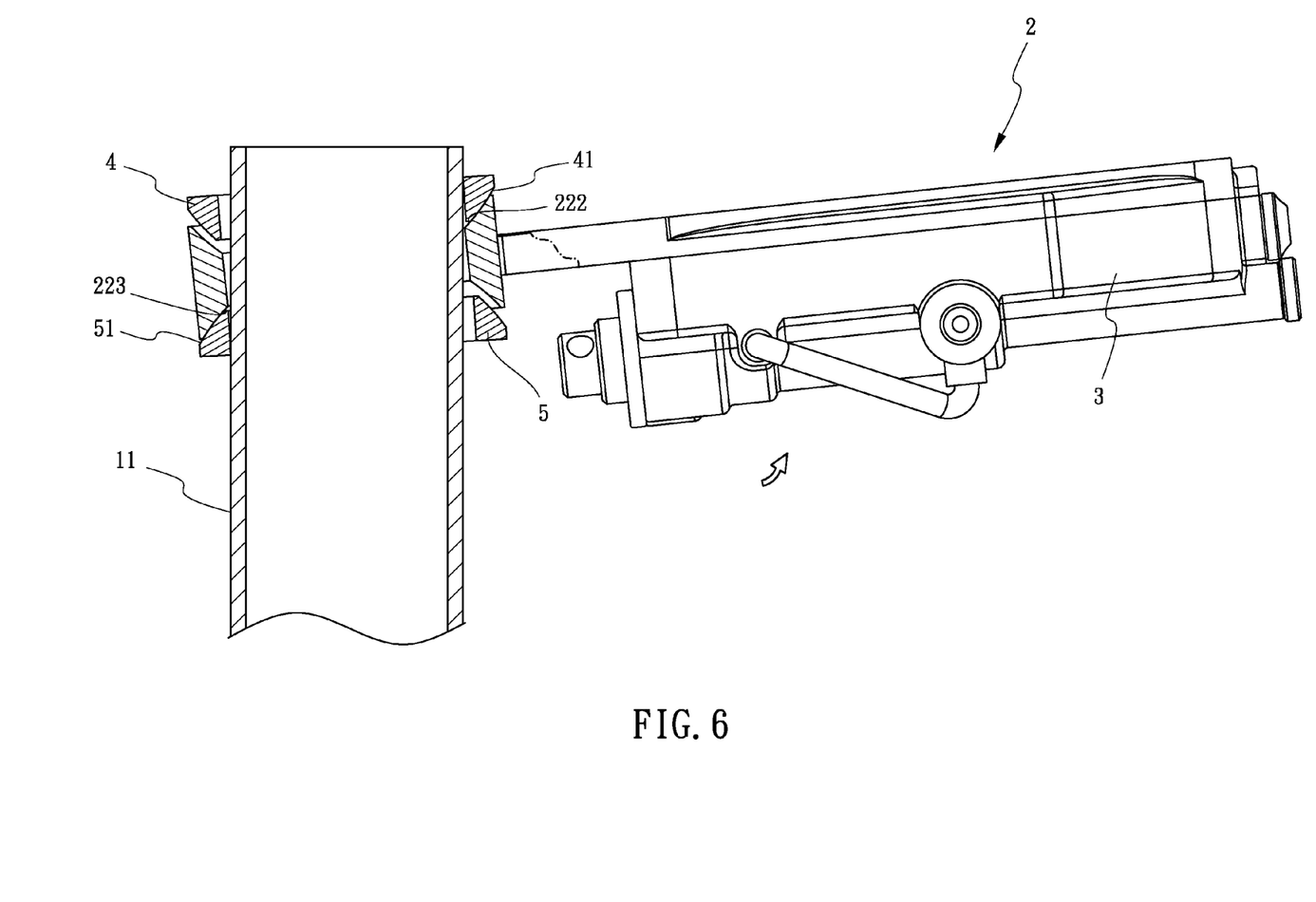
FIGS. 6-7 are side views for showing the present invention are adjusted upward and downward respectively.
Figure 7:
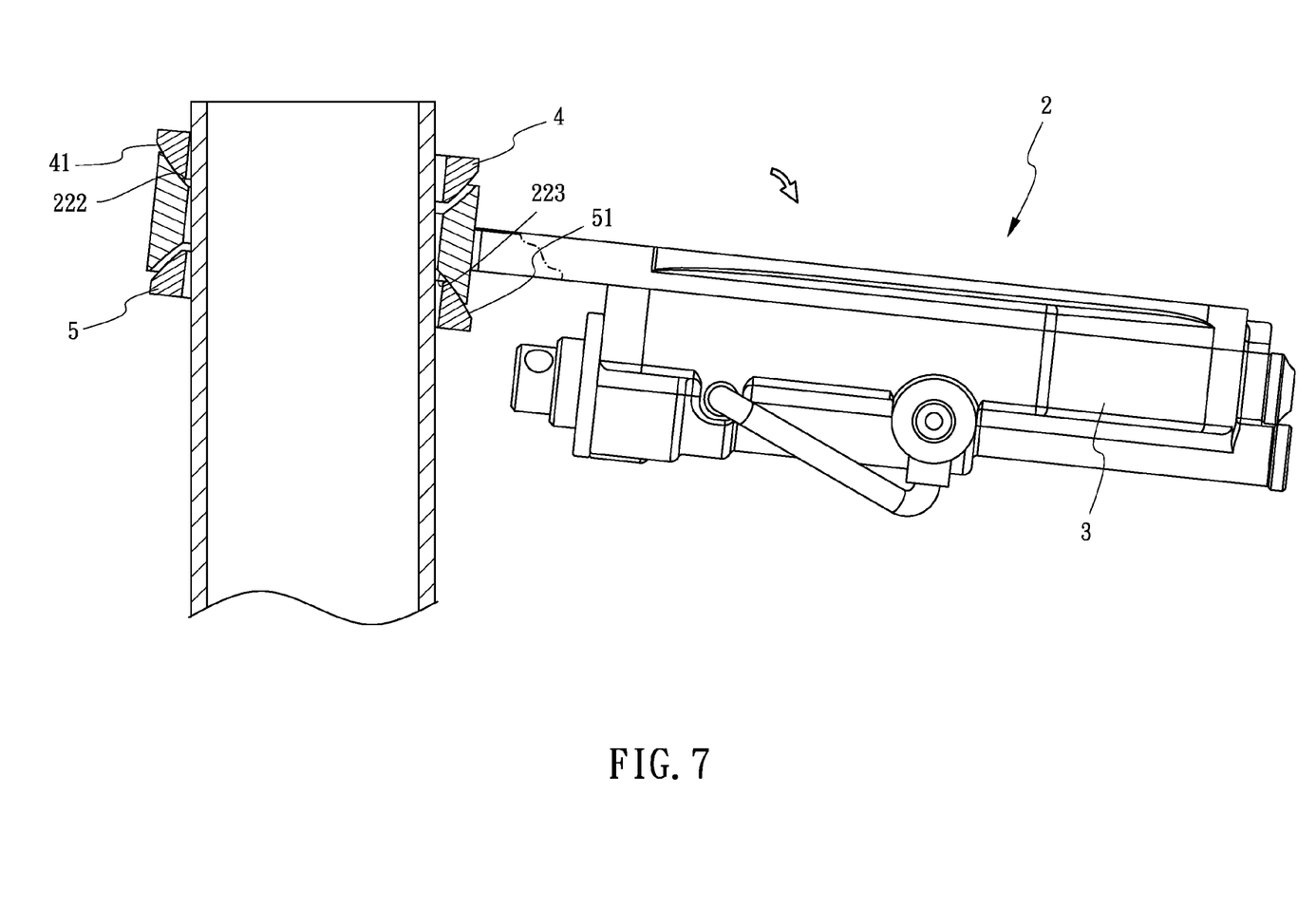

Referring to FIGS. 1-2, the first conical plane 222 further has two first limiting surfaces 224 which are opposite to each other. The second conical plane 223 further has two second limiting surfaces 225 which are opposite to each other. The first adjusting member 4 has two first vertical edges 42. Each first vertical edge 42 is abutted against each corresponding first limiting surface 224. The second adjusting member 5 has two second vertical edges 52. Each second vertical edge 52 is abutted against each corresponding second limiting surface 225.

Under this arrangement, each first limiting surface 224 and each second limiting surface 225 are abutted against each corresponding first vertical edge 42 and each corresponding second vertical edge 52 respectively so as to prevent the holder 2 from being deflected relative to the steering tube 11 and to restrict the holder 2 to be rotated relative to the stem 12. Therefore, the holder 2 is only adjusted relative to the steering tube 11 vertically, so that the holder 2 is close to the stem 12 or away from the stem 12.

Furthermore, the holder 2 has two connecting ribs 23 which connect the fixing portion 21 and the fastening portion 22. A distance is defined between the two connecting ribs 23. The holder 2 has a plurality of through holes 211 opened therethrough and a distance is defined between every two adjacent through holes 211. A plurality of screws 24 pass through the corresponding through holes 211 and screw into the hydraulic brake device 3 so as to fasten the hydraulic brake device 3 on the holder 2. The holder 2 has a plurality of via holes 226 defined at an outer periphery of the fastening portion 22. A plurality of fastening screws 25 pass through the corresponding via holes 226. A terminal end of each fastening screw 25 is abutted against an outer periphery of the steering tube 11.

Although the invention has been explained in relation to its preferred embodiment, it is to be understood that many other possible modifications and variations can be made without departing from the spirit and scope of the invention as hereinafter claimed.

What is claimed is:

1. An adjustable holder of a hydraulic brake device for a bicycle which is assembled on a steering tube and is located between a stem and a head part comprising:
    a holder, a first adjusting member and a second adjusting member;
    the holder having a fixing portion and a fastening portion defined at two ends thereof respectively, a hydraulic brake device assembled to a bottom of the fixing portion of the holder, the fastening portion having a fastening hole opened therethrough, the fastening hole sleeving onto the steering tube; and
    the first adjusting member and the second adjusting member sleeving onto the steering tube, one end of the first adjusting member and one end the second adjusting member abutted against two ends of the fastening hole respectively, another end of the first adjusting member abutted against one end of the stem, another end of the second adjusting member abutted against one end of the head part;
    wherein, the first adjusting member and the second adjusting member are abutted against the two ends of the fastening hole respectively, so that an angle of the holder relative to the steering tube is adjustable, which corresponds to an elevation angle of the stem.

2. The adjustable holder of a hydraulic brake device for a bicycle as claimed in claim 1, wherein the fastening hole of the holder has a first conical plane defined at one end thereof and a second conical plane defined at another end thereof; the first conical plane and the second conical plane are inclined toward a center of the fastening hole; the first adjusting member has a first abutting conical plane defined at one end thereof; the first abutting conical plane is abutted against the first conical plane; the second adjusting member has a second abutting conical plane defined at one end thereof; the second abutting conical plane is abutted against the second conical plane.

3. The adjustable holder of a hydraulic brake device for a bicycle as claimed in claim 2, wherein the first conical plane further has two first limiting surfaces which are opposite to each other; the second conical plane further has two second limiting surfaces which are opposite to each other; the first adjusting member has two first vertical edges; each first vertical edge is abutted against each corresponding first limiting surface; the second adjusting member has two second vertical edges; each second vertical edge is abutted against each corresponding second limiting surface; therefore, each first limiting surface and each second limiting surface are abutted against each corresponding first vertical edge and each corresponding second vertical edge respectively so as to prevent the holder from being deflected relative to the steering tube and to restrict the holder to be rotated relative to the stem.

4. The adjustable holder of a hydraulic brake device for a bicycle as claimed in claim 1, wherein the holder has two connecting ribs which connect the fixing portion and the fastening portion; a distance is defined between the two connecting ribs.

5. The adjustable holder of a hydraulic brake device for a bicycle as claimed in claim 1, wherein the holder has a plurality of through holes opened therethrough and a distance is defined between every two adjacent through holes; a plurality of screws pass through the corresponding through holes and screw into the hydraulic brake device so as to fasten the hydraulic brake device on the holder.

6. The adjustable holder of a hydraulic brake device for a bicycle as claimed in claim 1, wherein the holder has a plurality of via holes defined at an outer periphery of the fastening portion; a plurality of fastening screws pass through the corresponding via holes; a terminal end of each fastening screw is abutted against an outer periphery of the steering tube.

\* \* \* \* \*